Patented Sept. 17, 1935

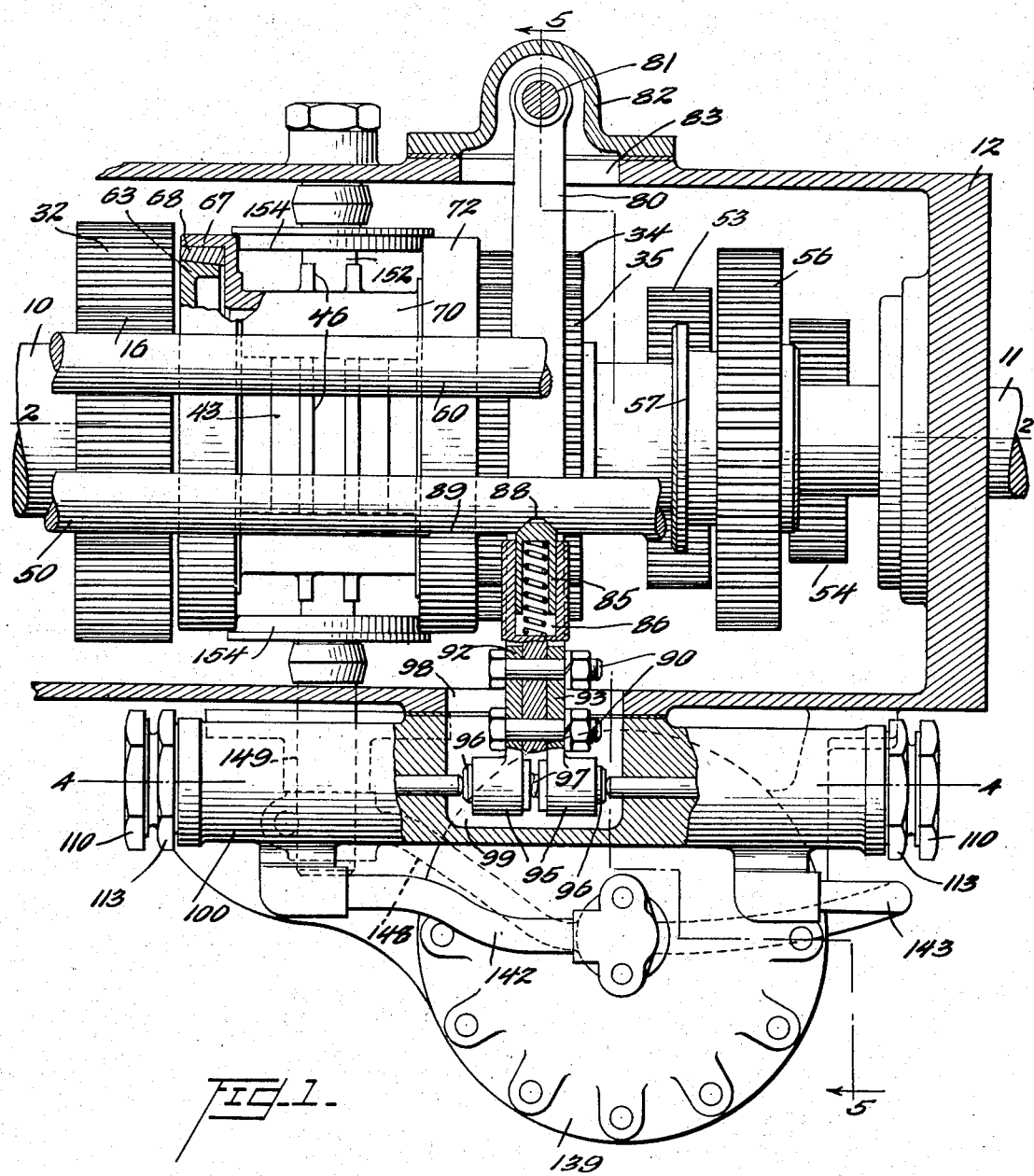

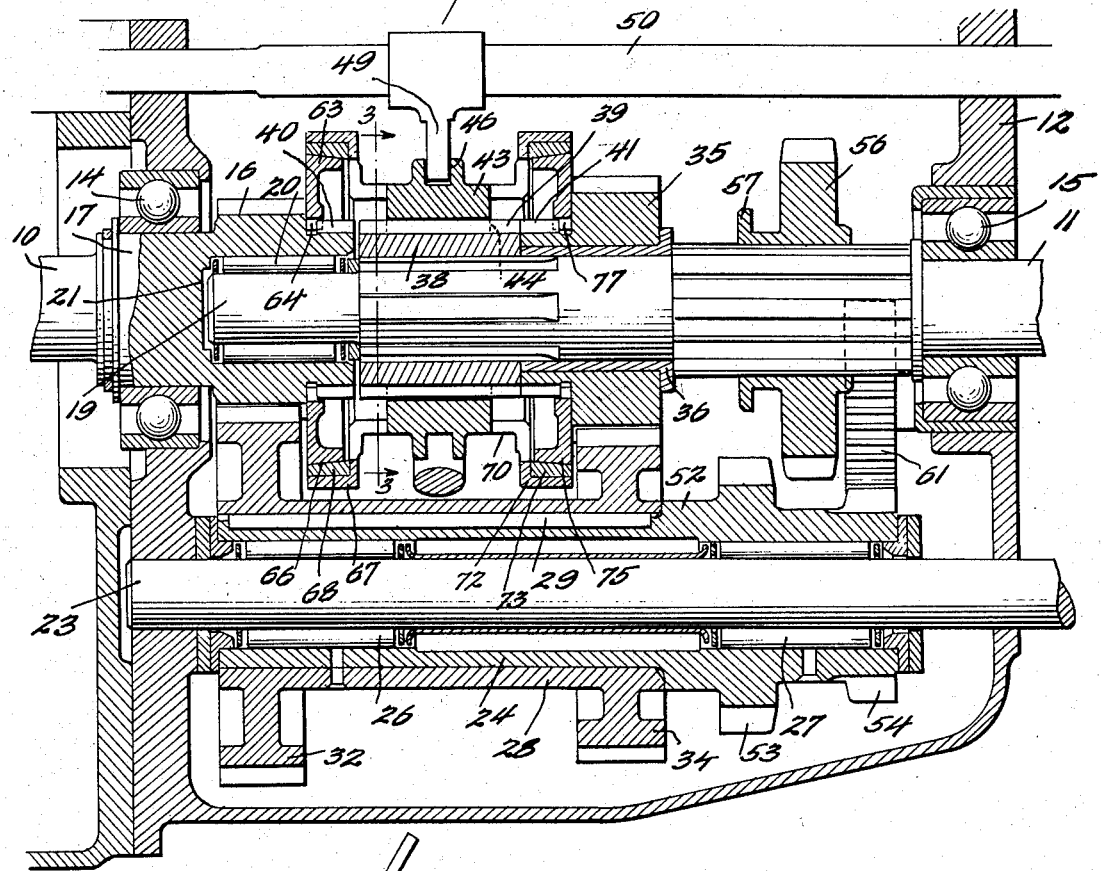

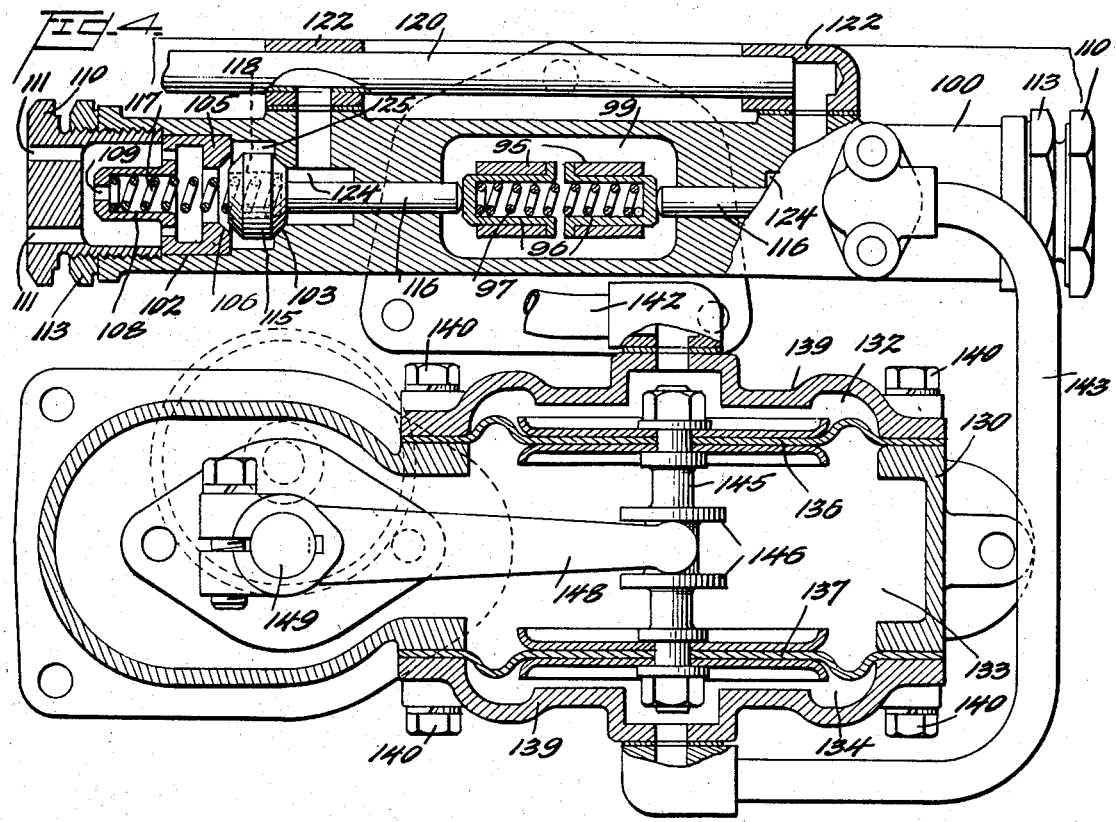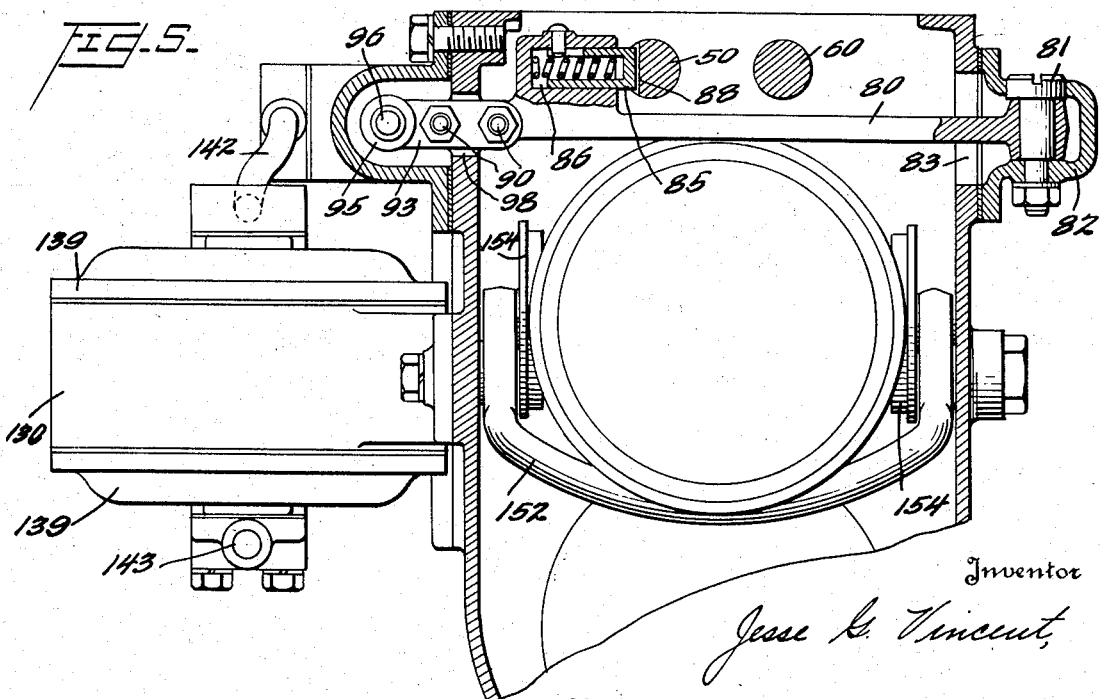

2,014,486

UNITED STATES PATENT OFFICE 2,014,486

TRANSMISSION MECHANISM

Jesse G. Vincent, Detroit, Mich., assignor to Packard Motor Car Company, Detroit, Mich., a corporation of Michigan Application December 17, 1931, Serial No. 581,708

26 Claims. (Cl. 74—339)

This invention relates to apparatus for transmitting torque from a driving to a driven element and is more particularly concerned with torque transmission apparatus for use in connection with change speed gearing such as is commonly used in motor vehicles.

It is an object of the invention to provide means for positively clutching and declutching a driving and driven element, for instance two adjacent elements in a train of change speed gearing, and means for effecting frictional clutching of these elements to ensure synchronization of movement thereof preliminary to the positive clutching of the elements. It is a feature of the invention that the means for effecting frictional clutching of the driving and driven elements is actuated by a fluid controlled device, the latter being in turn set in operation by the initiation of movement of the means which effects positive clutching of the elements. The arrangement is preferably such that movement of the positive clutching means to clutching position produces in sequence the frictional clutching of the elements, the release of the frictional connection, and finally the positive clutching of the elements.

A more specific object of the invention is the provision in a transmission gearing designed to selectively connect a driving shaft to a driven shaft either directly or through reducing gearing, of a fluid operated device for automatically ensuring the proper relative rotational speeds of the shafts prior to the positive connection of the same either directly or through the reduction gearing.

A further object of the invention is the provision of fluid controlled means for automatically synchronizing a driving and driven element which is simple and inexpensive to construct and which responds promptly and effectively in operation.

A further object of the invention is the provision in a motor vehicle transmission of means for synchronizing a driving and driven element which may be operated only when the main vehicle clutch is disengaged.

Further objects and features of the invention will be apparent from the following description taken in connection with the accompanying drawings, in which:

Figure 1 is a plan view, partly in section, of change speed gearing embodying the principles of the present invention;

Figure 2 is a vertical sectional view on the line 2—2 of Figure 1;

Figure 3 is a sectional view on the line 3—3 of Figure 2;

Figure 4 is a view partly in section on the line 4—4 of Figure 1;

Figure 5 is a sectional view taken substantially on the line 5—5 of Figure 1; and Figure 6 is a diagrammatic view illustrating one method of interconnecting the vehicle clutch and the gear synchronizing apparatus.

While, in the preferred form of the invention set forth herein for the purpose of illustration, the application of the principles of the invention to a transmission gearing for motor vehicles is disclosed, it will be appreciated from the following description that the invention is broader in scope and is applicable to any mechanism in which it is desired to rotatably connect two elements differing in their relative speed of rotation. Thus there is no intention of limiting the scope of the invention by the particularity with which the preferred embodiment thereof is described, various changes and alterations in the details of construction being contemplated.

Referring to the drawings, it will be observed that the change speed gearing illustrated in Figures 1 and 2 of the drawings serves to connect a driving shaft 10 to a driven shaft 11, these shafts extending through suitable bearings 14 and 15 in a transmission casing 12 which serves to enclose the gearing. It will be understood that the driving shaft 10 is arranged to be connected and disconnected from a driving motor by means of a main vehicle clutch located forwardly of the transmission casing and gearing and that the driven shaft 11 is suitably connected to the driving wheels of the vehicle. Secured to the rearward end of the shaft 10 is a gear 16, this gear having a reduced hub portion 17 passing through the bearing 14.

In order to ensure proper alignment of the driving and driven shafts, the driven shaft 11 is provided at its forward end with a reduced portion 19 which is journaled in a suitable bearing 20 in a recess 21 within the gear 16. A countershaft 23 disposed parallel to the driving and driven shafts is suitably supported at its ends in the transmission casing, and a sleeve 24 is rotatably mounted on the shaft 23 by means of bearings 26 and 27. A further sleeve 28 surrounds the sleeve 24 and is splined or keyed thereto as indicated at 29. Formed integrally with the sleeve 28 at the forward end thereof is a gear 32 meshing with the gear 16, and a gear 34 formed integrally with the sleeve 28 at the rearward end thereof meshes with a gear 35 rotatably mounted by means of a bearing 36 on the driven shaft 11.

It will be observed from the arrangement thus far described that when the main vehicle clutch is engaged, the gear 16 continually rotates at the speed of the motor, and the gear 35 continually rotates at a somewhat reduced speed, the latter being driven from the gear 16, through the gear 32, the sleeve 28, and the gear 34. It is thus obvious that, if the gear 16 is coupled to the driven shaft 11 for rotation therewith, direct drive will be obtained, whereas if the gear 35 is coupled to the driven shaft, a reduced speed of rotation of the driven shaft will result, this being the speed normally referred to as intermediate speed in the ordinary change speed transmission gearing for motor vehicles. The arrangement whereby the gears 16 and 35 are selectively coupled to the driven shaft will now be described.

Splined or otherwise secured to the driven shaft 11 is a sleeve 38 provided on its periphery with splines 39. Similarly, splined portions 40 and 41 are provided on the gears 16 and 35 respectively, and a collar 43 is provided with internally projecting teeth 44 cooperating with the splined portions of the sleeve 38 and gears 16 and 35, the collar being free to slide longitudinally of the driven shaft to positively connect either the gear 16 or the gear 35 to the sleeve 38. The collar 43 is further provided with a groove 46 in the periphery thereof adapted to receive a fork 49 carried by the shifter rod 50. It will be understood that the shifter rod 50 is slidably mounted in the transmission casing and is actuated by the operation of a gear shift lever in the conventional manner. Thus, when the shifter rod 50 is slid forwardly, the teeth 44 on the collar 43 are moved into interlocking engagement with the splined portion 40 of the gear 16 to couple the latter directly to the driven shaft 11. Similarly, movement of the shifter rod 50 to the rear serves to couple the gear 35 to the driven shaft 11, the latter being rotated from the driving shaft 10 by means of the gears 16, 32, 34, and 35 to provide a reduced or intermediate speed, as hereinbefore described.

The sleeve 24 is extended rearwardly to provide an enlarged hub portion 52, and the gears 53 and 54 are formed integrally with this hub portion, it being observed that the gear 53 is of smaller diameter than the gear 34. By reason of the splined connection 29 between the sleeves 28 and 24, the gears 53 and 54 are continuously rotated from the driving shaft 10 through the gears 16 and 32 during operation of the motor.

A gear 56 having a collar 57 arranged to be engaged by a fork carried by the shifter rod 60 is slidably mounted on and keyed or splined for rotation with the driven shaft 11. Thus movement of the shifter rod 60 in a forward direction serves to engage the gears 53 and 56 to effect rotation of the driven shaft at a rate of speed less than the intermediate speed hereinbefore referred to, this train of gearing constituting the conventional low speed train. When the shifter rod 60 is slid to the rear, the gear 56 is moved into engagement with a reverse idler 61 which engages with and is driven by the gear 54, thus providing for the reversal of direction of drive of the driven shaft.

It will be observed that the gearing thus far described is of the type commonly employed in motor vehicles. It is desirable, however, to establish synchronous movement of the parts which are coupled to provide for the direct and intermediate drive of the driven shaft immediately prior to the positive coupling of these parts through the collar 43. For this purpose a clutch member 63 is secured for rotation with the gear 16, the clutch member being provided with a splined portion 64 cooperating with the splined portion 40 on the gear 16. The periphery of the clutch member 63 is substantially conical as shown at 66 and is adapted to be engaged by a cooperating clutch member 67 having a friction facing 68. The clutch member 67 is preferably formed integrally with a spider 70, the grooved portion 46 of the collar 43 being interrupted at intervals of 90° so that the arms of the spider 70 may extend transversely across and be locked for rotation with the collar as shown in Figure 3. It will be seen, however, that the spider 70 is freely slidable on the collar 43 and longitudinally of the axis of the driving and driven shafts to couple or uncouple the clutch members 63 and 67.

Similarly the rearward end of the spider 70 is provided with a clutch member 72 having a friction facing 73 arranged to cooperate with a clutch member 75 which is secured to the gear 35 by means of the splined portion 77. Thus, forward sliding movement of the spider serves to frictionally connect the gear 16 secured to the driving shaft 10 with the driven shaft 11, the spider being connected for rotation with the collar 43 which is in turn splined to the sleeve 38 on the driven shaft, and rearward movement of the spider 70 effects frictional connection between the intermediate speed gear 35 and the driven shaft 11. By means of these frictional clutch members, the driven shaft 11 and either of the gears 16 and 35 may be brought to the same speed immediately before these gears are positively connected to the driven shaft by the operation of the collar 43. A preferred arrangement for effecting automatic operation of these friction clutch members in timed relation to the positive coupling movement of the collar 43 will now be described.

Referring more particularly to Figures 1, 4, and 5 of the drawings, it will be observed that a lever 80 is pivotally mounted as at 81 within the transmission casing. This pivotal mounting may, in order to facilitate assembly, be formed in a cap member 82 secured to the transmission casing so as to close the opening 83 therein through which the lever 80 extends. A spring pressed plunger 85 is mounted in a recess 86 adjacent the free end of the lever and is positioned to engage a recess 88 in the shifter rod 50, the rod being cut away as indicated at 89 on either side of the recess 88 to provide a substantially flat portion upon which the plunger 85 may ride when it is forced out of the recess 88 by relative movement of the lever 80 and shifter rod 50 as hereinafter described. Secured to the free end of the lever by bolts 90 is a pair of outwardly extending arms 92 and 93, each of these arms being provided with an eye 95 in which a plunger 96 is slidably mounted, these plungers being urged in opposite directions by a coiled spring 97 confined therein. The purpose of the coiled spring 97 is to accommodate the apparatus to possible variations in dimensioning of the parts, the plungers 96 being normally retained in the positions shown in Figure 4 of the drawings and partaking of no movement within the respective supporting eyes 95 during normal operation of the device.

It will be noted that the free end of the lever 80 and the parts carried thereby for supporting the plungers 96 extended through an aperture 98 in the transmission casing and into a recess 99 in a valve box 100 secured in any convenient manner to the side of the transmission casing. The opposite ends of this valve box are substantially identical, and for convenience only one end has been shown in section in Figure 4 of the drawings. A recess 102 formed in the valve box is provided with a valve seat 103, and a member 105 fitting within the recess 102 is similarly provided with a valve seat 106. The member 105 is further provided with a recessed portion 108 and with openings 109 in the end wall thereof. A plug 110 having openings 111 through the head thereof is threaded within the outer end of the recess 102 in the valve box 100 and is secured in position by means of a lock nut 113 threaded thereon, this plug serving to retain the member 105 in position in the recess 102. A valve member comprising a valve head 115 having oppositely facing seats arranged to cooperate with the valve seats 103 and 106 and having a stem 116 is slidably mounted in the valve box. The end of the stem 116 of the valve member normally engages the adjacent plunger 96 and a coiled spring 117 seated in the recessed portion 108 of the member 105, and a recess 118 in the head 115 of the valve member normally urges the latter to the right as shown in Figure 4 to close the opening defined by the valve seat 103.

A fluid conduit 120 connected at one end with a suction device, for instance the intake manifold of the engine, is operatively connected by means of fittings 122 secured to the valve box and having fluid passages therein to chambers 124 at the base of the recess 102 in each end of the valve box to produce a partial vacuum in these chambers. It will thus be observed that the chamber 125 intermediate the valve seats 103 and 106 will be supplied with air at atmospheric pressure when the valve member is moved to the right to engage the seat 103, as shown in Figure 4 of the drawings, or with air at reduced pressure when the valve is moved in the opposite direction to engage the seat 106 and place the chambers 124 and 125 in communication.

A fluid pressure device comprised within a housing 130 is secured in any convenient manner to the transmission casing. This fluid pressure device may assume various forms, but the arrangement shown in Figure 4 of the drawings is preferred in which the interior of the housing 130 is illustrated as separated into three compartments 132, 133, and 134 by diaphragms 136 and 137. To facilitate mounting of these diaphragms within the housing 130, the latter may be provided with openings across which the diaphragms extend, the closure members 139 secured in position by means of bolts 140 serving to clamp the diaphragms against the body of the housing and across the openings therein. The compartment 133 is open to atmospheric pressure while the compartments 132 and 134 are respectively placed in communication with the chambers 125 in the opposite ends of the valve box by means of fluid conduits 142 and 143. Accordingly the displacement of the valve member on the left-hand side of the valve box to the left, as shown in Figure 4, will place the compartment 132 in communication with the intake manifold of the engine and will prevent air from entering this compartment through the apertures 109 and 111.

The diaphragms 136 and 137 are mechanically connected by a member 145 provided with flanges 146 constituting a collar which is engaged by one end of a lever 148 secured to a shaft 149. The shaft 149 extends through the wall of the transmission casing and is secured therein to a yoke 152 partially embracing the driven shaft 11 and the parts mounted thereon between the friction clutch members. Secured to each arm of the yoke 152 on opposite sides of the shaft 11 are discs 154, these discs being rotatable on the arms of the yoke member and supported on axes eccentric to the shaft 149 and substantially in the horizontal plane containing the axis of the driven shaft 11. These discs are positioned between and in engagement with the clutch members 67 and 72. It will thus be observed that movement of the diaphragms 136 and 137 will impart a slight rotational movement to the shaft 149 through the lever 148, and the discs 154 will be moved to one side or the other, the clutch members 67 and 72 being carried therewith into engagement with the respective cooperating clutch members.

The operation of the arrangement thus far described will be apparent. When it is desired to connect the driving shaft 10 to the driven shaft 11 directly to operate the vehicle at high speed, the gear shift lever is manipulated in the usual manner to shift the rod 50 forwardly or to the left, as shown in Figure 1. Upon the initiation of this movement, the lever 80 will similarly be swung to the left by reason of the engagement of the spring pressed plunger 85 with the shifter rod 50. Thus the plunger 96, by reason of its engagement with the stem 116 of the valve member at the left-hand side of the valve box shown in Figure 4, will move the valve member to the left to close the chamber 125 to the atmosphere and to open this chamber to the conduit 120 to reduce the pressure therein. Since the corresponding valve member at the right-hand side of the valve box is not effected by this movement of the shifter rod, compartment 134 of the fluid actuated device remains at atmospheric pressure whereas the pressure in the compartment 132 is materially reduced. Thus the member 145 connecting the diaphragms 136 and 137 will move in response to the unequal pressure applied to opposite sides of the diaphragms to effect shifting of the spider 70 and the clutch member 67 carried thereby to engage the latter with the clutch member 63 for frictionally connecting the gear 16 with the driven shaft 11.

As the movement of the shifter rod 50 to the left continues, the lever 80 is unable to follow this movement by reason of the fact that the head 115 of the valve member is in engagement with the cooperating seat 106, and thus the spring pressed plunger 85 carried by the lever 80 is cammed out of the recess 88 in the rod. The spring 117 is thus free to return the head of the valve member 115 to its original position, admitting air under atmospheric pressure to the chamber 125 and closing the connection between that chamber and the intake manifold of the engine. Atmospheric pressure is thus restored in the compartment 132 of the fluid actuated device, and the diaphragms 136 and 137 are thus permitted to return to their initial position, the clutch members 67 and 73 being disengaged by the consequent rocking of the shaft 149. This temporary engagement of the cooperating clutch members serves to bring the driven shaft 11 and the gear 16 carried by the shaft 10 to substantially the same speed, it being observed that the main vehicle clutch is disengaged during the operation of shifting so that the synchronizing of the elements coupled by the friction clutch members 67 and 63 may be readily effected.

Continued movement of the shifter rod 50 to the left now results in the engagement of the toothed portion 44 of the collar 43 with the splined portion 40 of the gear 16, the parts engaging quietly by reason of the fact that they are rotating at the same speed, and the driving and driven shafts are thus positively coupled. When the shifter rod is returned to its original or neutral position, the plunger 85 again drops in the recess 88 in the rod. The operation is precisely the same when the gear shift lever is actuated in the usual manner to connect the gears in intermediate speed position, the shifter rod 50 being moved to the right and the valve mechanism at the right-hand side of the valve box 100 being operated thereby to momentarily reduce the pressure in the compartment 134 of the valve actuated device to engage the clutch members 72 and 75 prior to the positive coupling of the gear 35 and the driven shaft 11 by the collar 43.

The mechanism hereinbefore described is extremely sensitive, and it is possible that accidental movement of the shift lever while the main vehicle clutch is engaged might serve to engage either of the synchronizing friction clutches with resulting damage to the clutch facings. In order to obviate this difficulty, a valve 160 may be located in the conduit 120 at any convenient point intermediate the points of connection thereof with the valve box 100 and the intake manifold of the engine. This valve is preferably connected by suitable linkage 162 with the clutch pedal 163, the arrangement being such that when the clutch pedal is depressed for disengaging the main vehicle clutch for shifting the gears, the valve 160 will be opened to render the vacuum operated device operative. When the clutch pedal is released to engage the vehicle clutch, the valve 160 is closed, and it is thus impossible to supply the variations in pressure required to operate the fluid actuated device.

It will be observed that the preferred embodiment of the invention contemplates a construction in which the synchronizing friction clutches are operated by means which is independent of the means which serve to positively connect the driving and driven shafts in any desired speed ratio, except that movement of the apparatus for operating the synchronizing clutches is initiated by the operation of the conventional gear shift lever. Thus an extremely sensitive synchronizing apparatus is provided which is entirely automatic in operation.

Having thus described the invention, what is claimed as new and desired to be secured by Letters Patent is:—

1. In a change speed gearing, the combination with a driving shaft, of a driven shaft aligned therewith, an element carried by said driving shaft, an element rotatable about the axis of said driven shaft, a member movable in opposite directions to select and effect positive coupling of either of said elements to said driven shaft, a second member movable in opposite directions to effect frictional coupling of either of said elements to said driven shaft, means actuated upon initiation of selective movement of said first member to cause said second member to move into element coupling position, and means operable on further selective movement of said first member to cause said second member to move out of element coupling position, to frictionally couple and uncouple the selected element and the driven shaft before positive coupling thereof is effected, said second member being slidably supported on said first member.

2. In change speed gearing, the combination with a rotatable driving element, of an intermediate element coaxial with said driving element, said elements having splined portions, a driven element having a splined portion disposed between and aligned with the splined portions of said driving and intermediate elements, a member slidable on said driven element and cooperating with the splined portions of said elements to selectively couple said driven element with either of the other elements, said driving and intermediate elements being provided with friction clutch portions coaxial with the splined portions, a member slidable on said first named member for selectively engaging either of said friction clutch portions, means for moving said second member into engagement with the selected friction clutch portion, and means operable during coupling movement of said first named member for moving said second member out of engagement with the selected friction clutch portion.

3. In a device of the class described, the combination with a shaft, of spaced elements rotatable coaxially with the shaft, each of said elements having a positive clutch portion and a frictional clutch portion, a member rotatable with said shaft and slidable thereon into engagement with the positive clutch portion of either of said elements to selectively couple the latter to said shaft, a second member rotatable with said first member and slidable thereon to selectively engage the frictional clutch portion of either of said elements, means for moving said second member into engagement with the selected friction clutch portion, and means operable during coupling movement of said first named member for moving said second member out of engagement with the selected friction clutch portion.

4. In a device of the class described, the combination with a shaft, of spaced elements rotatable coaxially with the shaft, each of said elements having a positive clutch portion and a frictional clutch portion, a member rotatable with said shaft and slidable thereon into engagement with the positive clutch portion of either of said elements to selectively couple the latter to said shaft, a second member rotatable with said first member and slidable thereon to selectively engage the frictional clutch portion of either of said elements, said second member comprising oppositely facing clutch portions and a connecting spider, and said first member being provided with means extending through said spider for engagement by a clutch shifter, means for moving said second member into engagement with the selected friction clutch portion, and means operable during coupling movement of said first named member for moving said second member out of engagement with the selected friction clutch portion.

5. In a change speed gearing, the combination with a driving shaft, of a driven shaft aligned therewith, an element carried by said driving shaft, an element rotatable about the axis of said driven shaft, a member movable in opposite directions to select and effect positive coupling of either of said elements to said driven shaft, a second member movable in opposite directions to effect frictional coupling of either of said elements to said driven shaft, operating means for said first-named member, a fluid valve arranged to be shifted upon initial movement of said operating means, and a fluid actuated device controlled by said valve to cause said second member to frictionally couple and uncouple the selected elements and the driven shaft before positive coupling thereof is effected.

6. In a motor vehicle having change speed gearing including a synchronizer and a vehicle clutch, the combination with means associated with said vehicle clutch for preventing actuation of said synchronizer when said clutch is engaged, of means unaffected by said first named means and operable independently of said synchronizer for controlling said gearing to alter the speed ratio thereof.

7. In a motor vehicle having selective change speed gearing including a synchronizer and a vehicle clutch, the combination with a fluid pressure actuated device for controlling said synchronizer, of means associated with said vehicle clutch and said fluid pressure actuated device for rendering the latter inoperative when the clutch is engaged, and means operable independently of said fluid pressure actuated device for controlling said gearing to alter the speed ratio thereof.

8. In a motor vehicle having selective change speed gearing including a synchronizer and a vehicle clutch, the combination with a fluid pressure actuated device for controlling said synchronizer, of means associated with said vehicle clutch and said fluid pressure actuated device for rendering the latter inoperative when the clutch is engaged, said last-named means including a fluid conduit for supplying the pressure difference required for actuation of said device, a valve in said conduit, and connections between said valve and said vehicle clutch, and means operable independently of said fluid pressure actuated device for controlling said gearing to alter the speed ratio thereof.

9. In change speed gearing, the combination with a driving member, a driven member, means movable to effect positive driving connection between said driving and driven members, means for effecting frictional connection between said driving and driven members, and a fluid pressure device operable upon initial movement of said first-named means for actuating said second-named means.

10. In change speed gearing, the combination with a driving member, a driven member, means movable to effect positive driving connection between said driving and driven members, means for effecting frictional connection between said driving and driven members, and a fluid pressure device operable upon initial movement of said first-named means for actuating said second-named means, said fluid pressure device including a diaphragm, operative connections between said diaphragm and said second-named means, and fluid valve means operable by said first-named means for establishing different fluid pressures on opposite sides of said diaphragm.

11. In change speed gearing, the combination with a driving member, a driven member, means movable to effect positive driving connection between said driving and driven members, means for effecting frictional connection between said driving and driven members, a fluid pressure device operable upon initial movement of said first-named means for actuating said second-named means, a valve movable in opposite directions for applying different fluid pressures to said device, and means including a connection between said valve and said first named means for moving said valve first in one direction and then in the other direction to frictionally couple and uncouple said members before positive driving connection is effected.

12. In a change speed gearing, the combination with a driving member, a driven member, means movable to effect positive driving connection between said driving and driven members, frictional clutch means associated with said members, a fluid control device for operating said frictional clutch means, a valve associated with said device and having two positions for applying two different fluid pressures to said device to frictionally couple and uncouple said members, means normally urging said valve to one of said positions, and a connection between said valve and said first-named means for effecting movement of the valve to the other of the said positions and thereafter releasing said valve during initial movement of said first-named means and before positive connection of said members is effected.

13. In change speed gearing, the combination with a driving member, a driven member, means movable to effect positive driving connection between said driving and driven members, means for effecting frictional connection between said driving and driven members, a fluid pressure device operable upon initial movement of said first-named means for actuating said second-named means, an internal combustion engine for rotating said driving member, and means associated with said first-named means and with the engine intake for applying different fluid pressures to said device to operate the same.

14. In apparatus of the class described, the combination with change speed gearing, of means including a shifter rod for altering the ratio of said gearing, a synchronizing device for said gearing, fluid pressure controlled means for actuating said synchronizing device, a valve for regulating the pressure of fluid applied to said pressure controlled means, means including a detent operatively engaging said shifter rod for moving said valve on initiation of movement of said rod, and means whereby said detent is released and said valve returned to initial position before movement of said rod is completed.

15. In apparatus of the class described, the combination with change speed gearing, of means including a shifter rod for altering the ratio of said gearing, a synchronizing device for said gearing, fluid pressure controlled means for actuating said synchronizing device, a valve for regulating the pressure of fluid applied to said pressure controlled means, said valve having two positions, the first corresponding to inoperative condition and the second to operative condition of said synchronizing device, and means including a connection between said rod and said valve for moving the valve from the first to the second position and back to the first connection before movement of the rod is completed.

16. In change speed gearing of the type comprising a driving shaft, a driven shaft, means for positively coupling the driving and driven shafts at different speed ratios, and a synchronizing member shiftable in opposite directions to frictionally couple the driving and driven shafts at the corresponding speed ratios, the combination with a fluid pressure device operatively connected to said member, of a pair of valves for controlling said device, one of said valves serving to effect movement of said device in one direction and the other of said valves serving to effect movement of said device in the other direction, and means associated with said first-named means for moving one of said valves when said first-named means is operated to couple said driving and driven members at one speed ratio, and for moving the other of said valves when said first-named means is operated to couple said driving and driven members at another speed ratio.

17. In change speed gearing of the type comprising a driving shaft, a driven shaft, means for positively coupling the driving and driven shafts at different speed ratios, and a synchronizing member shiftable in opposite directions to frictionally couple the driving and driven shafts at the corresponding speed ratios, the combination with a fluid pressure device operatively connected to said member, of a pair of valves for controlling said device, one of said valves serving to effect movement of said device in one direction and the other of said valves serving to effect movement of said device in the other direction, means associated with said first-named means for moving one of said valves when said first-named means is operated to couple said driving and driven members at one speed ratio, and for moving the other of said valves when said first-named means is operated to couple said driving and driven members at another speed ratio, and means whereby the valve thus moved is returned to its initial position prior to the completion of shifting of said first named means to positively couple said shafts.

18. In change speed gearing, the combination with mechanism operable to vary the speed ratio, of a synchronizing device, a casing, a pair of fluid-tight diaphragms for separating said casing into three compartments, one of said compartments being disposed intermediate the other two and containing air at atmospheric pressure, means extending within said intermediate compartment for connecting said diaphragms with said synchronizing device, and means actuated by said mechanism for selectively establishing a pressure other than atmospheric in either of the other compartments.

19. In a motor vehicle having selective change speed gearing and a vehicle clutch, the combination with a mechanical device for selectively operating said gearing to alter the driving ratio thereof, of means for effecting synchronization of said gearing prior to the completion of the selecting operation, a fluid pressure actuated device for controlling said means, and means associated with said vehicle clutch and said fluid pressure actuated device for rendering the latter inoperative when the clutch is engaged.

20. In a motor vehicle having selective change speed gearing and a vehicle clutch, the combination with a mechanical device for selectively operating said gearing to alter the driving ratio thereof, of means for effecting synchronization of said gearing prior to the completion of the selecting operation, a fluid pressure actuated device for controlling said means, and means associated with said vehicle clutch and said fluid pressure actuated device for rendering the latter inoperative when the clutch is engaged, said last named means including a fluid conduit for supplying the pressure difference required for actuation of said device, a valve in said conduit, and connections between said valve and said vehicle clutch.

21. In change speed gearing, the combination with a driving member, a driven member, means movable to a predetermined position to effect positive driving connection between said driving and driven members, means movable in opposite directions to frictionally connect and disconnect said driving and driven members, and a fluid pressure device operable upon initial movement of said first named means toward said predetermined position only to move said second named means in opposite directions.

22. In a motor vehicle having selective change speed gearing, the combination with means for effecting synchronization of said gearing prior to selection thereof to alter the driving ratio, of a fluid pressure actuated device for controlling said means, and means operable independently of said device for selecting said gearing.

23. In a motor vehicle having selective change speed gearing, the combination with a mechanical device for selectively operating said gearing to alter the driving ratio thereof, of means for effecting synchronization of said gearing prior to the completion of the selecting operation, and a fluid pressure actuated device for controlling said means.

24. In a motor vehicle having selective change speed gearing including a synchronizer, the combination with means for effecting selection of said gearing, of a servo-motor controlled by said means for actuating said synchronizer.

25. In a motor vehicle having selective change speed gearing including a synchronizer, the combination with mechanical means for effecting selection of said gearing, of a fluid motor controlled by said means for actuating said synchronizer.

26. In a motor vehicle having selective change speed gearing including a synchronizer, the combination with mechanical means for effecting selection of said gearing, of means including a servo-motor operable successively in opposite directions during selection of said gearing to render said synchronizer first effective and then ineffective.

JESSE G. VINCENT.